United States Patent
Lappe

[15] 3,668,107
[45] June 6, 1972

[54] DIAPHRAGM CELL FOR THE ELECTROPHORESIS OF SUBSTANCE MIXTURES

[72] Inventor: Franz Lappe, Hofheim, Taunus, Germany

[73] Assignee: Farbwerke Hoechst Aktiengesellschaft Vormals Meister Lucius & Bruning, Frankfurt am Main, Germany

[22] Filed: Mar. 10, 1970

[21] Appl. No.: 18,128

[30] Foreign Application Priority Data

Mar. 17, 1969 Germany ...................... P 19 13 411.3

[52] U.S. Cl. ........................ 204/301, 204/180 R, 204/180 P
[51] Int. Cl. ...................................... B01d 13/02, B01k 5/00
[58] Field of Search ............................. 204/180, 180 P, 301

[56] References Cited

UNITED STATES PATENTS

| | | | |
|---|---|---|---|
| 3,025,227 | 3/1962 | Kollsman | 204/301 X |
| 3,099,615 | 7/1963 | Kollsman | 204/180 |
| 3,228,867 | 1/1966 | Chen | 204/301 |
| 3,493,488 | 2/1970 | Sisk | 204/301 |

Primary Examiner—J. H. Mack
Assistant Examiner—A. C. Prescott
Attorney—Curtis, Morris & Safford

[57] ABSTRACT

For the electrophoresis of electrically charged particles in a solvent mixture diaphragm cells are used which are characterized by a special arrangement of the inlet and outlet openings.

3 Claims, 6 Drawing Figures

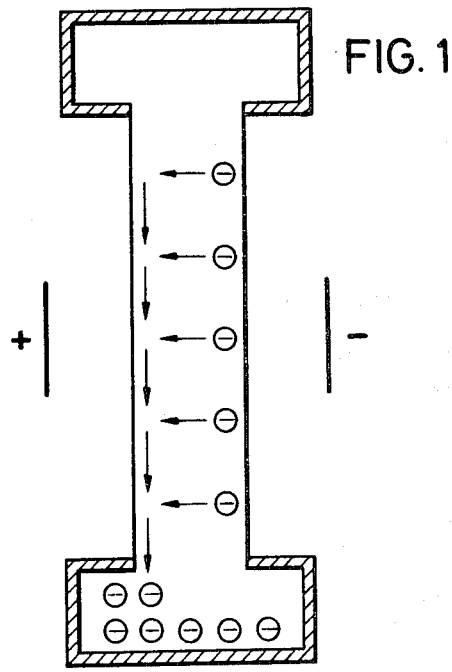
FIG. 1
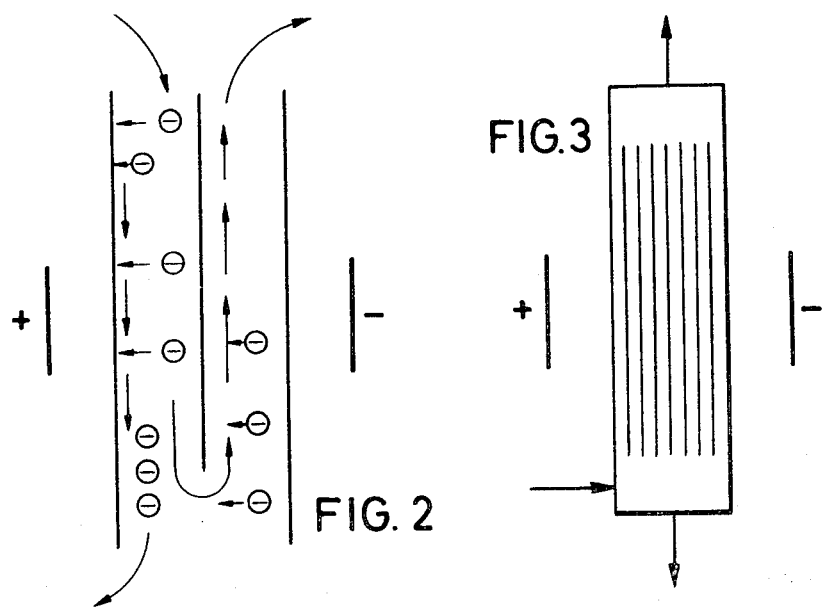
FIG. 2
FIG. 3
INVENTOR
FRANZ LAPPE

PATENTED JUN 6 1972 3,668,107

SHEET 2 OF 3

INVENTOR
FRANZ LAPPE

BY Curtis, Morris + Safford
ATTORNEYS

DIAPHRAGM CELL FOR THE ELECTROPHORESIS OF SUBSTANCE MIXTURES

The present invention relates to a device in the form of a diaphragm cell for the continuous separation, purification or concentration of substance mixtures containing high molecular weight soluble matter, colloidally dissolved substance mixtures, or substance mixtures suspended in buffer solutions, which mixtures form electrically charged particles, by electrophoresis and sedimentation in vertical cells with semipermeable diaphragms. The diaphragm cells are filled with the substance mixture to be separated and with a buffer solution. The diaphragm cell is introduced into a vessel containing the same buffer solution and provided with laterally fitted electrodes and current leads to produce the approximately homogeneous field necessary for electrophoresis.

Figure 4:
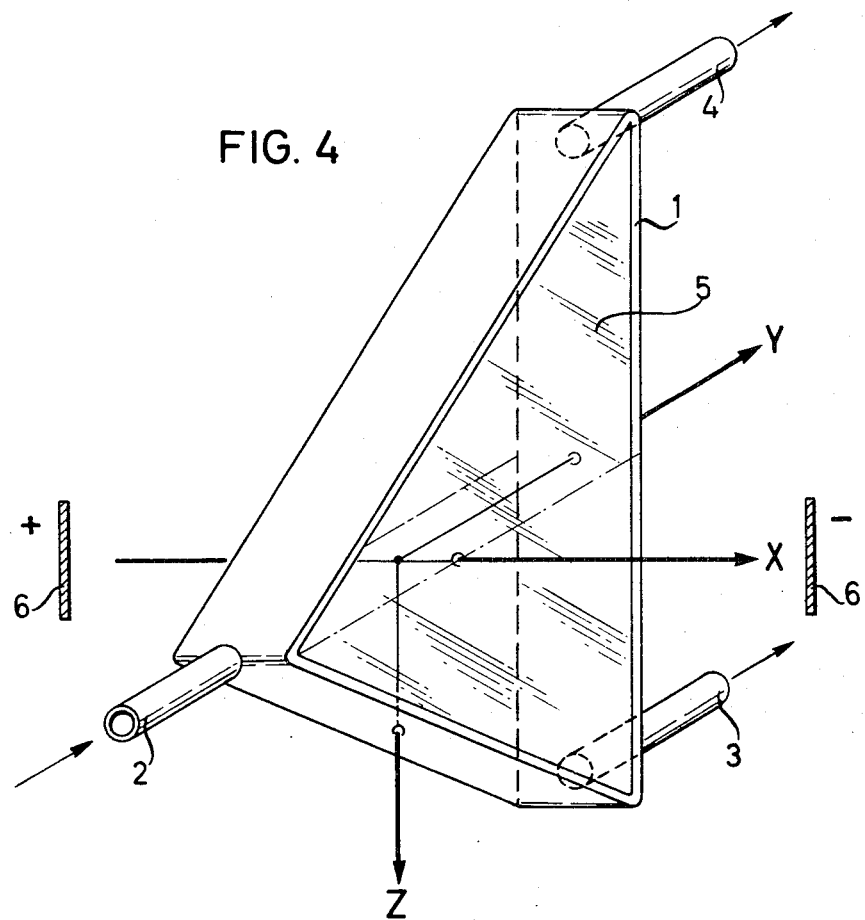
Figure 5:
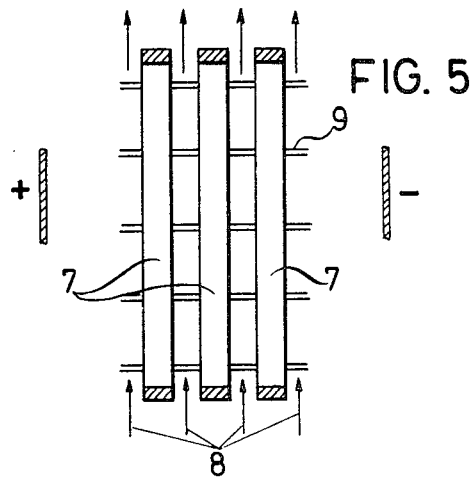
Figure 6:
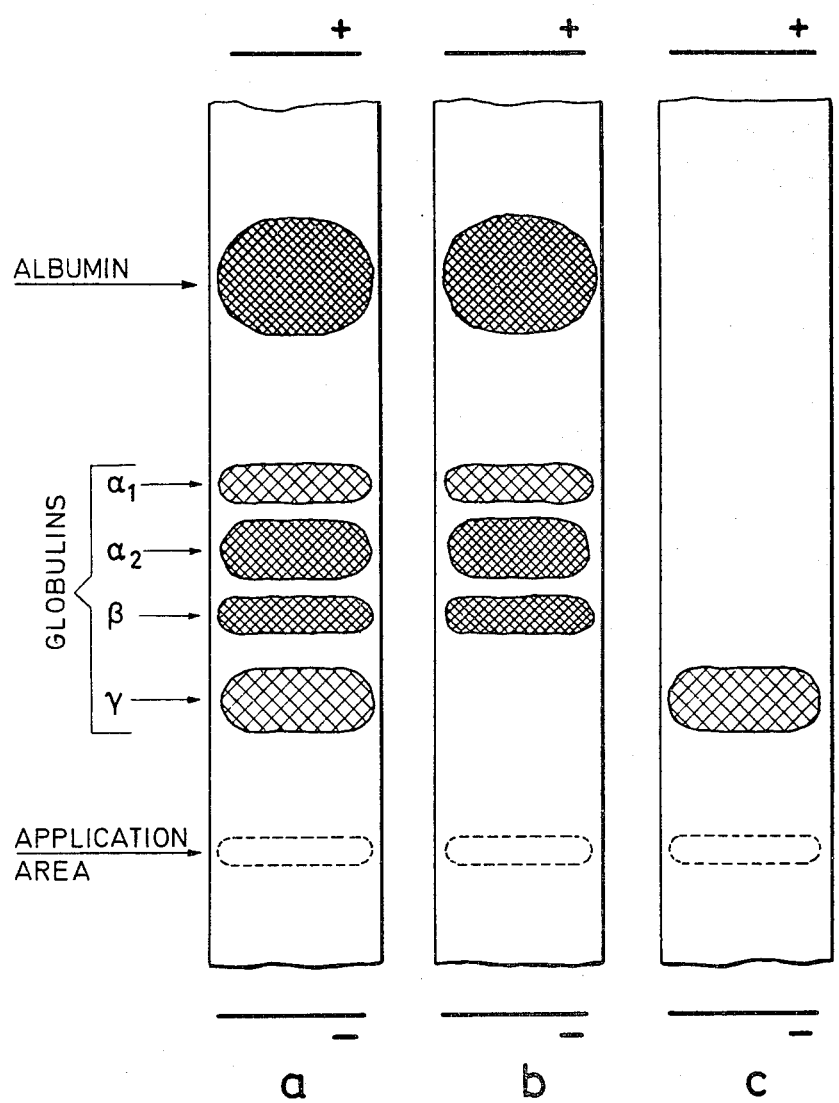

The separation or concentration of substance mixtures is now described with reference to FIGS. 1 to 3 of the accompanying drawings. FIGS. 4 and 5 illustrate the device according to the invention in operating condition and FIG. 6 represents various electrophoresis strips.

As an example for a soluble, high molecular weight or colloidally dissolved substance mixture a protein mixture is used.

The method now described, which can be carried out in discontinuous manner, was developed by Kirkwood (J.Am.Chem.Soc., volume 71 (1949)). The protein mixture is combined with a buffer solution the pH of which has been adjusted in a manner such that only one protein constituent in the solution remains electrically neutral, while all other proteins take a more or less pronounced, mostly negative electric charge (seldom a positive charge). When such a solution is placed in an electric field, the electrically charged proteins migrate in the said field (FIG. 1). If a diaphragm, which is permeable only to the buffer ions and impermeable to the proteins, is positioned in front of the electrode towards which the charged proteins migrate, the charged proteins concentrate at the semi-permeable diaphragm. Consequently, the density of the solution increases at the diaphragm and the portion of the solution enriched with the charged proteins sinks to the lower section of the cell. In the upper section there remains the solution depleted of electrically charged proteins.

A continuous electrophoretic separation, purification and/or concentration has been described by Bier (Science, volume 125, page 1084 (1957)) and by Polson (Biochem. et Biophys. Acta 11, page 315 (1953,) and Brit. Pat. No. 726,186).

The method proposed by Bier uses three membranes in parallel position with respect to one another (FIG. 2). The two outer membranes separate the space containing the protein mixture from the outer space containing the buffer solution and the electrodes to apply the electric field. The central shorter membrane divides the volume of liquid, a direct connection existing only in the lower part. The protein mixture to be separated is fed into the upper part of the half at the anode side of the electrode. The electrically charged proteins deposit at the outer membrane of the anode side, whereas the uncharged proteins migrate below the shorter central membrane into the space at the cathode side. This arrangement has the disadvantage that mobile proteins which have not yet been separated in the space at the anode side migrate in the space at the cathode side to the central membrane.

In the space at the cathode side they also tend to deposit but in this section they must migrate against the ascending flow of the liquid. Therefore, the separating effect is reduced in the space at the cathode side. The separation in the space at the anode side is hindered by an unstable stratification of liquid portions of different density. The density of the mixture to be separated and introduced at the top is higher than the density of the liquid from which the charged proteins have been separated and which shall flow in the lower section from the anode side to the cathode side. Consequently, in the compartment at the anode side undesired transpositions take place which disturb the separation.

Separating cells have likewise been proposed in which the central membrane is replaced by a filter, whereby, however, the disturbing transposition of layers is not obviated.

The separation apparatus according to Polson comprises a plurality of membranes arranged in parallel position with respect to one another at small distances (FIG. 3). Two outer membranes separate the group of membranes from the electrode space adapted to contain the buffer solution. Above and below the group of membranes a joint compartment for the entire group is provided. The group of membranes has the disadvantage that the Joule's heat, necessarily produced when the electric field is applied, is difficult to eliminate from the interior of the group of membranes. Even with a weak intensity of the electric field, the temperature in the interior of the group is, therefore, higher than the temperature of the exterior cooled by the circulating buffer. The convection current thus produced considerably disturbs the separation process. Moreover, the mixture to be separated flows upwards in countercurrent flow with the charged proteins separated from the mixture which descend, whereby the separation process is likewise impaired.

The present invention provides a diaphragm cell for the continuous separation, purification or concentration of substance mixtures by electrophoresis and sedimentation comprising a frame provided with an inlet opening and two outlet openings and two semi-permeable diaphragms, wherein the said openings form a triangle in which the distance between the outlet openings at one side of the triangle is less than three times the perpendicular line drawn from the inlet opening to the said side.

Especially good results are obtained with a diaphragm cell in which the frame has the shape of an isosceles, right-angled triangle, the inlet opening is positioned within the range of the right angle and the outlet openings are within the range of the two base angles. The two semi-permeable diaphragms have a distance from one another, corresponding to the breadth of the frame, of about 1.5 to 3 mm.

When such a triangular diaphragm cell having a crest angle of 90° is used for electrophoretic separation, it is placed in the buffer solution in a manner such that the hypothenuse is in perpendicular position.

A diaphragm cell according to the invention is illustrated in FIG. 4. The cell is placed in a vessel containing the buffer solution. The frame 1 with inlet opening 2 and outlet openings 3 and 4 lies within the homogeneous electric field between the electrodes 6. The diaphragm 5 is fixed on the frame. The diaphragm consists of the usual dialysis materials, made, for example of cellulose hydrate, prepared cellulose acetate or of animal products.

The advantage of the diaphragm cells according to the invention becomes obvious when examining the motion of the particles through the cells. The particles enter the diaphragm cell through the inlet opening and flow in the direction of the Y-axis. The particles are subject to the simultaneous action of the gravity in the direction Z and the electric field in the direction X. The flow of liquid (in direction Y), the flow of sedimentation (in direction Z) and the electrophoretic motion (in direction X) can take place independently of one another without mutual disturbances so that an optimum separating effect can be obtained with the diaphragm cell according to the invention.

It has surprisingly been found that in the diaphragm cell according to the invention also undialyzed serums can be separated.

When a plurality of the novel diaphragm cells are placed side by side in parallel position, as shown in FIG. 5, larger amounts of substances can be separated. The cooled buffer solution 8 flows round the individual cells 7 so that the Joule's heat produced can be readily eliminated. In such an arrangement the diaphragm cells are fastened by spacers 9. It is suitable to raise the pressure in the diaphragm cell above the pressure of the surrounding buffer solution. The diaphragm cells then rest on the spacers and keep their stable position.

The separating effect can be further improved by arranging a plurality of diaphragm cells one behind the other, whereby especially pure substances can be obtained.

The following Examples illustrate the invention.

EXAMPLE 1

A diaphragm cell in the form of an isosceles, right triangle having a length of the short sides of 200 millimeters and a spacing of the diaphragms of 2 millimeters with a dialysis diaphragm of cellulose was fastened with the hypothenuse in perpendicular position in a homogeneous electric field having a field strength of 10V/cm in a buffer solution cooled at 8° C. As buffer solution a 0.67 molar phosphate buffer according to Sorensen was used having a pH of 6.8. The buffer solution was not only used as surrounding cooling liquid, but also to dilute the undialyzed serum to be separated which essentially consisted of albumin and four different globulins. Five hundred milliliters of the serum, containing 15 grams of total protein, were diluted with 500 milliliters of buffer solution.

The diluted, undialyzed serum was uniformly introduced into the diaphragm cell at a rate of flow of 25 milliliters of serum per hour. The ratio of the liquid leaving at the upper outlet opening to the liquid leaving at the lower outlet opening was adjusted to a value of 4 : 1.The ratio of 4 : 1 resulted in a yield of 80 percent of the original amount of liquid containing the separated gamma-globulin. This amount of solution was withdrawn at the upper outlet opening. The gamma-globulin obtained had a purity of over 95 percent. The electrophoresis strips shown in FIG. 6 and used for the analysis of protein mixtures distinctly demonstrate the high purity of the serum obtained (Strip c). For comparison, there are shown the electrophoresis strips of the serum withdrawn at the lower outlet opening (b) and of the original serum (a). The electrophoretic analysis using strips has been described in detail, for example in "Electrophoresis" by Milan Bier, Academic Press Inc. New York, 1959.

EXAMPLE 2

A tissue infested with poliomyelitis viruses was reduced to small pieces and a suspension was prepared with a buffer having a pH of 6.5.

The suspension was fed into the separating cell described in Example 1 at a rate of flow of 20 milliliters per hour. The field strength was 6 V/cm, the cooled buffer solution (6°– 8° C) had a pH of 6.5. The concentration of the viruses at the lower outlet opening was more than doubled while the portion of tissue was strongly reduced.

EXAMPLE 3

A colloidal solution of 0.5 gram of platinum per liter was treated in the diaphragm cell described in Example 1 at a field strength of 10 V/cm and a rate of flow of 20 milliliters per hour. The solution leaving the cell had four times the original content of platinum.

What I claim is:

1. A diaphragm cell for the continuous separation, purification or concentration of mixtures by electrophoresis and sedimentation comprising two semi-permeable and vertical membranes spaced apart by a triangular frame having a substantially vertical wall member and two inclined wall members converging with one another at an apex opposite said vertical wall member, said frame having an inlet opening at said apex and two outlet openings at the upper and lower ends of said vertical wall member, the distance between the two outlet openings being smaller than three times the perpendicular distance from the inlet opening to a line connecting the two outlet openings.

2. A diaphragm cell as claimed in claim 1, wherein the frame has the shape of an isosceles, right-angled triangle, the inlet opening is within the range of the crest angle and the outlet openings are arranged within the range of the two basis angles.

3. A diaphragm cell as claimed in claim 1, wherein the distance between the semi-permeable diaphragms is in the range of from about 1.5 to about 3 millimeters.

* * * * *